(12) United States Patent
Xiong et al.

(10) Patent No.: US 10,915,286 B1
(45) Date of Patent: Feb. 9, 2021

(54) DISPLAYING SHARED CONTENT ON RESPECTIVE DISPLAY DEVICES IN ACCORDANCE WITH SETS OF USER PREFERENCES

(71) Applicant: LENOVO (Singapore) PTE. LTD., New Tech Park (SG)

(72) Inventors: Hong Xiong, Raleigh, NC (US); Song Wang, Cary, NC (US); Mengnan Wang, Chapel Hill, NC (US); Zhenyu Yang, Morrisville, NC (US)

(73) Assignee: Lenovo (Singapore) PTE LTD, New Tech Park (SG)

( * ) Notice: Subject to any disclaimer, the term of this patent is extended or adjusted under 35 U.S.C. 154(b) by 0 days.

(21) Appl. No.: 16/656,028

(22) Filed: Oct. 17, 2019

(51) Int. Cl.
  *G06F 3/14* (2006.01)
  *G06K 9/62* (2006.01)
  *G06F 3/0484* (2013.01)
  *G06K 9/00* (2006.01)
  *H04L 29/08* (2006.01)

(52) U.S. Cl.
  CPC ........ *G06F 3/1423* (2013.01); *G06F 3/04845* (2013.01); *G06K 9/00677* (2013.01); *G06K 9/6201* (2013.01); *G06K 9/6256* (2013.01); *H04L 67/306* (2013.01)

(58) Field of Classification Search
  USPC .............................................. 345/156, 690
  See application file for complete search history.

(56) References Cited

U.S. PATENT DOCUMENTS

| 2012/0066602 | A1* | 3/2012 | Chai | H04L 65/403 715/733 |
| 2014/0280498 | A1* | 9/2014 | Frankel | H04L 65/4084 709/203 |
| 2014/0280567 | A1* | 9/2014 | Kang | H04L 65/1089 709/204 |
| 2014/0282851 | A1* | 9/2014 | Miller | H04L 63/102 726/1 |
| 2015/0013016 | A1* | 1/2015 | Kanter | H04L 67/10 726/28 |
| 2016/0072857 | A1* | 3/2016 | Seto | H04L 65/403 709/204 |
| 2016/0225187 | A1* | 8/2016 | Knipp | G06T 19/006 |
| 2017/0048184 | A1* | 2/2017 | Lewis | H04L 51/32 |
| 2017/0063772 | A1* | 3/2017 | Bapat | G06F 21/604 |
| 2017/0300718 | A1* | 10/2017 | Geinitz | G06F 21/6254 |

(Continued)

*Primary Examiner* — Tony O Davis
(74) *Attorney, Agent, or Firm* — Kunzler Bean & Adamson

(57) ABSTRACT

Apparatus, systems, methods, and computer program products that can include and/or provide individualized display layouts in multi-person, multi-display collaborative environments are disclosed herein. An apparatus includes a processor and a memory configured to store code executable by the processor. The code is executable to identify multiple different users participating in a communication session for multiple communication devices in which each communication device includes a display device and is associated with a different user. The code is further executable by the processor to display shared content on each respective display device in accordance with a respective set of user preferences for displaying the shared content for each different user. Systems, methods, and computer program products may include and/or are configured to perform the functions and/or operations of the apparatus.

17 Claims, 14 Drawing Sheets

(56) References Cited

U.S. PATENT DOCUMENTS

| | | | |
|---|---|---|---|
| 2018/0150353 A1* | 5/2018 | Gladwin | G06F 3/0613 |
| 2018/0225369 A1* | 8/2018 | Cora | G06F 16/34 |
| 2018/0225370 A1* | 8/2018 | Cora | G06F 16/9535 |
| 2019/0007720 A1* | 1/2019 | Palnitkar | G06F 16/9535 |
| 2019/0138651 A1* | 5/2019 | Xiong | G06F 16/353 |

* cited by examiner

DISPLAYING SHARED CONTENT ON RESPECTIVE DISPLAY DEVICES IN ACCORDANCE WITH SETS OF USER PREFERENCES

FIELD

The subject matter disclosed herein relates to including and/or providing individualized display layouts in multi-person, multi-display collaborative environments and more particularly relates to apparatus, systems, methods, and computer program products that can display shared content on respective display devices in accordance with sets of user preferences.

BACKGROUND

During a communication session in conventional multi-person, multi-display collaborative environments, shared content is displayed to each participant of the communication session on a display associated with each respective participant. That is, the shared content is displayed on each respective display in the same manner and/or format such that all of the displays are essentially copies of one another and/or look the same while displaying the shared content.

BRIEF SUMMARY

Apparatus, systems, methods, and computer program products that can include and/or provide individualized display layouts in multi-person, multi-display collaborative environments are disclosed herein. An apparatus, in one embodiment, includes a processor, and a memory configured to store code executable by the processor. The code, in certain embodiments, is executable by the processor to identify a plurality of different users participating in a communication session for a plurality of communication devices in which each communication device in the plurality of communication devices includes a display device and is associated with a different user in the plurality of different users. The code is further executable to display a shared content on each respective display device in accordance with a respective set of user preferences for displaying the shared content for each different user in the plurality of different users.

One embodiment of a method for including and/or providing individualized display layouts in multi-person, multi-display collaborative environments includes identifying, by use of a processor, a plurality of different users participating in a communication session for a plurality of communication devices in which each communication device in the plurality of communication devices includes a display device and is associated with a different user in the plurality of different users. The method further includes displaying a shared content on each respective display device in accordance with a respective set of user preferences for displaying the shared content for each different user in the plurality of different users.

Also disclosed are computer program products including a computer-readable storage medium configured to store code executable by a processor to include and/or provide individualized display layouts in multi-person, multi-display collaborative environments. One embodiment of a computer program product includes code that is executable by a processor to perform identifying a plurality of different users participating in a communication session for a plurality of communication devices in which each communication device in the plurality of communication devices includes a display device and is associated with a different user in the plurality of different users. The code is further executable by the processor to perform displaying a shared content on each respective display device in accordance with a respective set of user preferences for displaying the shared content for each different user in the plurality of different users.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not, therefore, to be considered to be limiting of scope, the embodiments will be described and explained with additional specificity and detail through the use of the accompanying drawings, in which.

DETAILED DESCRIPTION

Figure 1A:
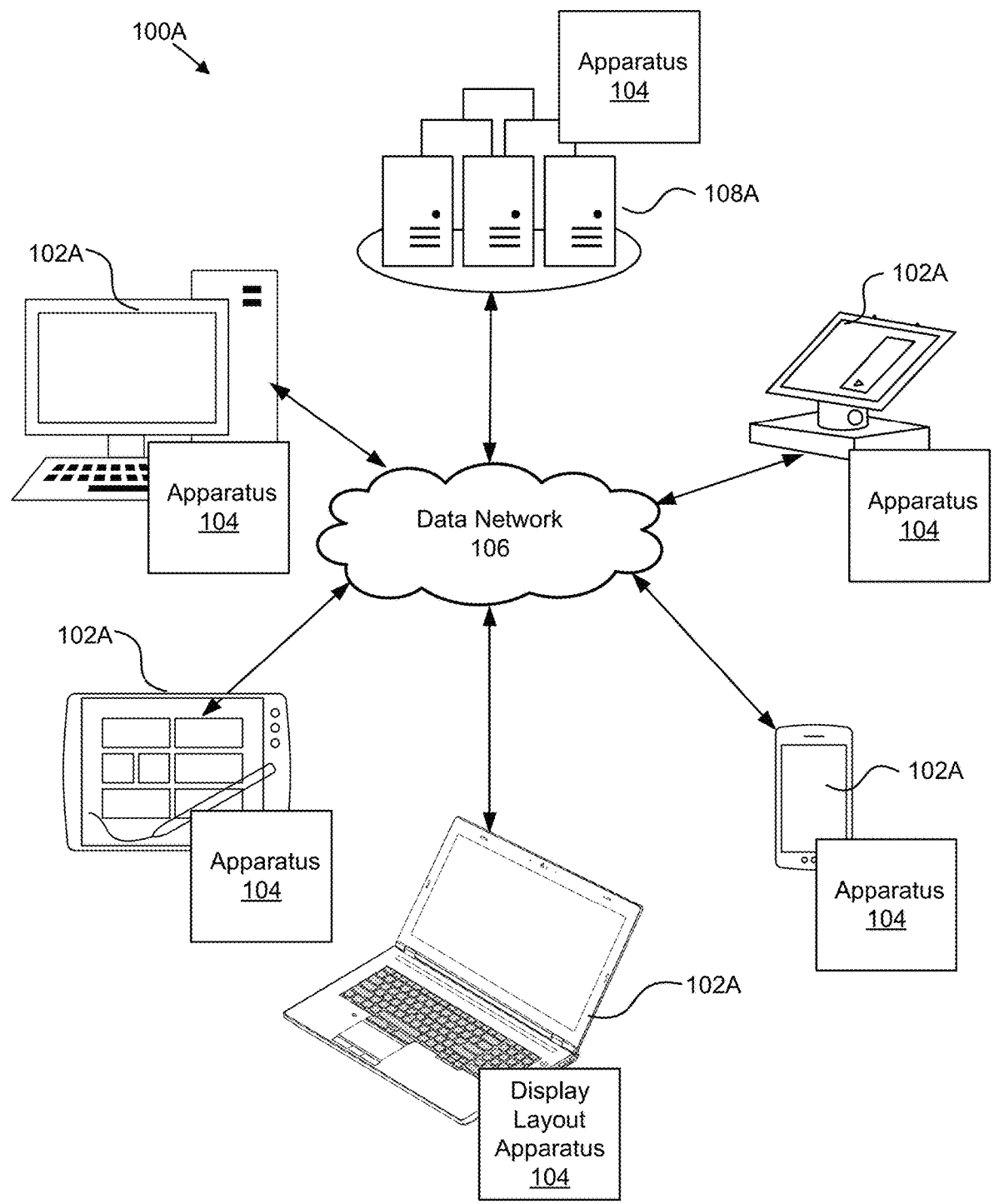
FIGS. 1A and 1B are schematic diagrams illustrating various embodiment of a system for including and/or providing individualized display layouts in multi-person, multi-display collaborative environments.

As will be appreciated by one skilled in the art, aspects of the embodiments may be embodied as an apparatus, system, method, and/or computer program product. Accordingly, the various embodiments may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the various embodiments may take the form of a computer program product embodied in one or more computer-readable storage devices storing machine-readable code, computer-readable code, and/or program code, which can simply be referred to hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules to more particularly emphasize their implementation independence. For example, a module may be implemented as a hardware circuit comprising custom VLSI circuits or gate arrays, off-the-shelf semiconductors, such as logic chips, transistors, or other discrete components. A module may also be implemented in programmable hardware devices such as field-programmable gate arrays, programmable array logic, programmable logic devices, or the like.

Modules may also be implemented in code and/or software for execution by various types of processors. An identified module of code may, for instance, include one or more physical or logical blocks of executable code that may, for instance, be organized as an object, procedure, or function. Nevertheless, the executables of an identified module need not be physically located together but may include disparate instructions stored in different locations that, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer-readable media may be utilized. The computer-readable media may include a computer-readable storage medium. The computer-readable storage medium may include a storage device configured to store the code. The storage device may be, for example, but is not limited to, an electronic, magnetic, optical, electromagnetic, infrared, holographic, micromechanical, or semiconductor system, apparatus, or device, or any suitable combination of the foregoing.

More specific examples (e.g., a non-exhaustive list) of the storage device may include the following: an electrical connection including one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing, among other storage devices that are possible and contemplated herein. In the context of this document, a computer-readable storage medium may be any tangible medium that can contain or store a program for use by or in connection with an instruction execution system, apparatus, or device.

Code for carrying out operations for embodiments may be written in any combination of one or more programming languages including an object-oriented programming language such as Python, Ruby, R, Java, JavaScript, Smalltalk, C++, C sharp, Lisp, Clojure, PHP, or the like, and conventional procedural programming languages, such as the "C" programming language, or the like, and/or machine languages such as assembly languages, among other programming languages that are possible and contemplated herein. The code may execute entirely on the user's computer, partly on the user's computer, as a stand-alone software package, or partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

In addition, as used herein, the term "set" can mean "one or more," unless expressly specified otherwise. The term "sets" can mean multiples of or a plurality of "one or mores," "ones or more," and/or "ones or mores" consistent with set theory, unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatus, systems, and program products according to various embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which executes on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatus, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers in the figures refer to like elements in all of the figures, including alternate embodiments of like elements. The figures illustrate and are discussed with reference to various embodiments of apparatus, systems, methods, and computer program products that can include and/or provide individualized display layouts in multi-person, multi-display collaborative environments.

An apparatus, in one embodiment, includes a processor, and a memory configured to store code executable by the processor. The code, in certain embodiments, is executable by the processor to identify a plurality of different users participating in a communication session for a plurality of communication devices in which each communication device in the plurality of communication devices includes a display device and is associated with a different user in the plurality of different users. The code is further executable to display a shared content on each respective display device in accordance with a respective set of user preferences for displaying the shared content for each different user in the plurality of different users.

In various embodiments, the code is further executable by the processor to determine the respective set of user preferences for displaying the shared content corresponding to each identified different user. Here, each set of user preferences for displaying the shared content includes a data layout preference, a data characteristic preference, and/or a context preference. In some embodiments, identifying each different user participating in the communication session is based on a unique login for each different user and/or a biometric signature for each different user.

In additional or alternative embodiments, the code is further executable by the processor to generate the set of user preferences for displaying the shared content for each different user based on a historical pattern of use for one or more portions of the shared content or a heat map of use for one or more portions of the shared content. In some embodiments, the set of user preferences for displaying the shared content for each different user is generated utilizing a machine learning algorithm based on the historical pattern of usage or the heat map of usage or a pattern matching algorithm based on the historical pattern of usage or the heat map of usage. In one embodiment, the set of user preferences for displaying the shared content for each different user is generated utilizing the machine learning algorithm and the machine learning algorithm includes a deep learning algorithm.

In further additional or alternative embodiments, the code is further executable by the processor to generate a plurality of different sets of user preferences for a particular user and implement the respective set of user preferences for displaying the shared content for the particular user in response to the respective set of user preferences for displaying the shared content being a single set of user preferences corresponding to the shared content for the particular user. In other additional or alternative embodiments, the code is further executable by the processor to generate a plurality of different sets of user preferences corresponding to the shared content for a particular user, present the plurality of different sets of user preferences for displaying the shared content for a particular user to the particular user, and implement the respective set of user preferences for displaying the shared content for the particular user in response to receiving an input from the particular user selecting the respective set of user preferences for displaying the shared content for the particular user. In still other additional or alternative embodiments, the code is further executable by the processor to generate a plurality of different sets of user preferences for a particular user, calculating a confidence score for each different set of user preferences, and implement the respective set of user preferences for displaying the shared content for the particular user in response to the respective set of user preferences for displaying the shared content for the particular user including a greatest calculated confidence score.

One embodiment of a method for including and/or providing individualized display layouts in multi-person, multi-display collaborative environments includes identifying, by use of a processor, a plurality of different users participating in a communication session for a plurality of communication devices in which each communication device in the plurality of communication devices includes a display device and is associated with a different user in the plurality of different users. The method further includes displaying a shared content on each respective display device in accordance with a respective set of user preferences for displaying the shared content for each different user in the plurality of different users.

In some embodiments, the method further includes determining the respective set of user preferences for displaying the shared content corresponding to each identified different user. Here, identifying each different user participating in the communication session is based on a unique login for each different user and/or a biometric signature for each different user. Further, each set of user preferences for displaying the shared content includes a data layout preference, a data characteristic preference, and/or a context preference.

In additional or alternative embodiments, the method further includes generating, via a deep learning algorithm or a pattern matching algorithm, the set of user preferences for each different user. The deep learning algorithm or the pattern matching pattern algorithm is based on a historical pattern of use for one or more portions of the shared content or a heat map of use for one or more portions of the shared content.

In other additional or alternative embodiments, the method further includes generating a plurality of different sets of user preferences for a particular user and implementing the respective set of user preferences for displaying the shared content for the particular user in response to the respective set of user preferences for displaying the shared content being a single set of user preferences corresponding to the shared content for the particular user. In still other additional or alternative embodiments, the method further includes generating a plurality of different sets of user preferences corresponding to the shared content for a particular user, presenting the plurality of different sets of user preferences for displaying the shared content to the particular user, and implementing the respective set of user preferences for displaying the shared content for the particular user in response to receiving an input from the particular user selecting the respective set of user preferences for displaying the shared content. In yet further additional or alternative embodiments, the method further includes generating a plurality of different sets of user preferences for a particular user, calculating a confidence score for each different set of user preferences, and implementing the respective set of user preferences for displaying the shared content for the particular user in response to the respective set of user preferences for displaying the shared content for the particular user including a greatest calculated confidence score.

Also disclosed are computer program products including a computer-readable storage medium configured to store code executable by a processor to include and/or provide individualized display layouts in multi-person, multi-display collaborative environments. One embodiment of a computer program product includes code that is executable by a processor to perform identifying a plurality of different users participating in a communication session for a plurality of communication devices in which each communication device in the plurality of communication devices includes a display device and is associated with a different user in the plurality of different users. The code is further executable by the processor to perform displaying a shared content on each respective display device in accordance with a respective set of user preferences for displaying the shared content for each different user in the plurality of different users.

In some embodiments, the executable code further comprises code to perform generating, via a deep learning algorithm or a pattern matching algorithm, the set of user preferences for each different user. The deep learning algorithm or the pattern matching algorithm is based on a historical pattern of use for one or more portions of the shared content or a heat map of use for one or more portions of the shared content. The executable code further comprises code to perform determining the respective set of user preferences for displaying the shared content corresponding to each identified different user. Here, identifying each different user participating in the communication session is based on a unique login for each different user and/or a biometric signature for each different user. Further, each set of user preferences for displaying the shared content includes a data layout preference, a data characteristic preference, and/or a context preference.

In additional or alternative embodiments, the executable code further comprises code to perform generating a plurality of different sets of user preferences for a particular user and implementing the respective set of user preferences for displaying the shared content for the particular user in response to the respective set of user preferences for displaying the shared content being a single set of user preferences corresponding to the shared content for the particular user. In other additional or alternative embodiments, the executable code further comprises code to perform generating a plurality of different sets of user preferences corresponding to the shared content for a particular user, presenting the plurality of different sets of user preferences for displaying the shared content for the particular user to the particular user, and implementing the respective set of user preferences for displaying the shared content for the particular user in response to receiving an input from the particular user selecting the respective set of user preferences for displaying the shared content for the particular user. In still other additional or alternative embodiments, the executable code further comprises code to perform generating a plurality of different sets of user preferences for a particular user, calculating a confidence score for each different set of user preferences, and implementing the respective set of user preferences for displaying the shared content for the particular user in response to the respective set of user preferences for displaying the shared content for the particular user including a greatest calculated confidence score.

With reference now to the Figures, FIG. 1A is a schematic block diagram illustrating one embodiment of a system 100A that can include and/or provide individualized display layouts in multi-person, multi-display collaborative environments. The system 100A is configured to customize the manner in which shared content is displayed on each respective display device (or simply, "display") or screen of each user or participant in a collaborative environment in accordance with a set of preferences for the user associated with a respective display or screen. At least in the illustrated embodiment, the system 100A includes, among other components, a set of computing devices 102A and a set of servers 108A coupled to and/or in communication with one another. As shown in FIG. 1A, one or more computing devices 102A and/or one or more servers 108A can include a display layout apparatus 104.

A computing device 102A may include any suitable hardware and/or software that can facilitate including and/or providing individualized display layouts in multi-person, multi-display collaborative environments. Further, a computing device 102A may include any suitable computing system and/or device that includes and/or is coupleable to (e.g., capable of being coupled to and/or capable of being in communication with) a set of displays and/or a set of screens. Examples of a computing device 102A include, but are not limited to, one or more workstations, one or more desktop computing devices, one or more laptop computing devices, one or more tablet computing devices, and/or one or more smartphones, one or more displays, one or more display panels, one or more touch panels, one or more screens, and/or one or more touchscreens, etc., among other computing systems and/or devices that can include and/or be coupled to a set of display devices and/or a set of screens that are possible and contemplated herein.

A set of computing devices 102A may include any suitable quantity of computing devices 102A. In some embodiments, each computing device 102A in the set of computing devices 102A is the same type of computing device 102A. In other embodiments, at least two (2) computing devices 102A in the set of computing devices 102A are different types of computing devices 102A. In further embodiments, each computing device 102A in the set of computing devices 102A is a different type of computing device 102A.

A computing device 102A, in various embodiments, may include one or more processors, processor cores, and/or the like processing devices that are configured to execute various programs, program code, applications, instructions, functions, and/or the like for include and/or provide individualized display layouts in multi-person, multi-display collaborative environments. For example, in some embodiments, a computing device 102A can use the data network 106 to download application-specific user preference modules, algorithms, and/or to update user data, such as user preference data and/or user profiles.

In certain embodiments, a computing device 102A can be coupled to and/or in communication with one or more other computing devices 102A over a data network 106, as described below. In additional or alternative embodiments, a computing device 102A can be coupled to and/or in communication with one or more servers 108A over the data network 106.

A server 108A may include any suitable hardware and/or software that can facilitate including and/or providing individualized display layouts in multi-person, multi-display collaborative environments. In various embodiments, a server 108A may be embodied as a blade server, a mainframe server, a tower server, a rack server, and/or the like servers. In additional or alternative embodiments, a server 108A may be configured as a mail server, a web server, an application server, an FTP server, a media server, a data server, a web server, a file server, and/or a virtual server, etc, among other types of servers that are possible and contemplated herein. In further additional or alternative embodiments, a server 108A may include a back-end server configured to facilitate machine translation of text/speech, analysis of machine-translated text using artificial intelligence, and/or marking-up a copy of the machine-translated text, etc., among other operations and/or functions capable of being performed by a back-end server that are possible and contemplated herein.

A set of servers 108A may include any suitable quantity of servers 108A. In some embodiments, each server 108A in the set of servers 108A is the same type of server 108A. In other embodiments, at least two servers 108A in the set of servers 108A are different types of servers 108A. In further embodiments, each server 108A in the set of servers 108A is a different type of server 108A.

A server 108A, in various embodiments, may include one or more processors, processor cores, and/or the like processing devices that are configured to execute various programs, program code, applications, instructions, functions, and/or the like for include and/or provide individualized display layouts in multi-person, multi-display collaborative environments. For example, in some embodiments, a server 108A can use the data network 106 to download application-specific user preference modules, algorithms, and/or to update user data, such as user preference data and/or user profiles.

The data network 106, in one embodiment, includes a digital communication network that transmits digital communications. The data network 106 may include a wireless network, such as a wireless cellular network, a local wireless network, such as a Wi-Fi network, an ad hoc network, and/or the like. The data network 106 may include a wide area network ("WAN"), a storage area network ("SAN"), a local area network ("LAN"), an optical fiber network, the internet, or other digital communications network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. All standards and/or connection types include the latest version and revision of the standard and/or connection type as of the filing date of this application.

In some embodiments, one or more computing devices 102A include a display layout apparatus 104. In other embodiments, one or more servers 108A include a display layout apparatus 104. In further embodiments, one or more computing devices 102A and one or more servers 108A include a display layout apparatus 104.

A display apparatus 104 may include any suitable hardware and/or software that can include and/or provide individualized display layouts in multi-person, multi-display collaborative environments. In various embodiments, a display layout apparatus 104 includes a processor and a memory that stores computer-readable and/or computer-useable code executable by the processor.

In some embodiments, the computer-readable and/or computer-useable code, when executed by the processor, causes the processor to establish a communication session for a plurality of communication devices in which each communication device includes a display device and is associated with a different user. The computer-readable and/or computer-useable code, when executed by the processor, further causes the processor to display shared content on each respective display device in accordance with a respective set of user preferences for displaying the shared content for each different user.

In additional or alternative embodiments, the processor is specifically configured to establish a communication session for a plurality of communication devices in which each communication device includes a display device and is associated with a different user. The processor is further configured to display shared content on each respective display device in accordance with a respective set of user preferences for displaying the shared content for each different user.

A display layout apparatus 104 for use on the set of computing devices 102A can improve the efficiency and/or experience of a user viewing and/or working with the shared content in a collaborative environment. For example, customizing the display of the shared content of a collaborative environment in accordance with the preferences of each individual user or participant may be important for certain applications, projects, and/or types of data. That is, it may be useful, more efficient, and/or more effective for different displays associated with different users to display the same shared content differently on different displays in accordance with the unique user preference associated with each particular user.

A set of user preferences for displaying the shared content can include one or more preferences related to any suitable characteristic and/or factor for displaying the shared content on a display or screen. Further, the user preference(s) in a set of user preferences can be related to the shared content and/or one or more portions of the shared content. Examples of a user preference can include, but are not limited to, a data layout preference, a data characteristic preference, and/or a context preference, etc. for a particular user, among other user preferences that are possible and contemplated herein. In other words, the same shared content can be displayed on two or more different displays (and/or screens) with one or more different characteristics and/or with one or more other display variations between the displays.

A data layout preference can include any suitable preference related to the spacial presentation of the shared content and/or one or more portions of the shared content on a particular display. Example data layout preferences can include, but are not limited to, spacial arrangements, spacial dimensions, and/or spacial locations, etc., among other spacial characteristics for presenting the shared data and/or one or more portions of the shared data.

A data characteristic preference can include any suitable preference related to a characteristic of the shared content and/or one or more portions of the shared content on a particular display. Example data characteristic preferences can include, but are not limited to, data dimensions, colors, fonts, brightness, resolution, auditory volume, auditory pitch, auditory tone, and/or the like visual and/or auditory characteristics that are possible and contemplated herein.

A context preference can include any suitable preference related to one or more factors related to the context in which the content is shared. In some non-limiting examples, a context preference can be based on a type of data in the shared content, a type of data for one or more portions of the shared content, a level of importance of the shared content, a level of importance for one or more portions of the shared content, an owner of the shared content, an owner of one or more portions of the shared content, the quantity of owners of the shared content, the type of computing device utilized by a user, the type of display utilized by the user, the type of screen utilized by the user, the quantity of computing devices utilized by a user, the quantity of displays utilized by the user, the quantity of screens utilized by the user, a status or characteristic of one or more other participants, the quantity of other participants, and/or the environment in which the user, the owner(s), the other participant(s), the computing device(s), the display(s), and/or the screen(s) currently reside, among other contextual factors that can form the basis of a user preference that are possible and contemplated herein.

A set of user preferences may be generated based on and/or from any suitable data. In various embodiments, a set of user preferences may be generated based on and/or from a historical pattern of use for one or more portions of the shared content or a heat map of use for one or more portions of the shared content.

In some embodiments, a set of user preferences can be generated utilizing a machine learning algorithm that analyzes the historical pattern of use or the heat map of use for the portion(s) of the shared content. The machine learning algorithm can analyze the historical pattern of usage or the heat map of usage to learn how a user has displayed shared content in the past and calculates how the user prefers the shared content to be displayed based on the analysis. In some embodiments, the machine learning algorithm includes a deep learning algorithm.

In other embodiments, a set of user preferences can be generated utilizing a pattern matching algorithm. The pattern matching algorithm can analyze the historical pattern of usage or the heat map of usage and determine how a user prefers the shared content to be displayed based on matching and/or determining which characteristic(s) and/or factor(s) are utilized most frequently by the user when displaying the shared content and/or one or more portions of the shared content.

Some display layout apparatus 104 may include and/or store a single set of user preferences for a user and automatically implement the set of user preferences in displaying the shared content. Other display layout apparatus 104 may include and/or store multiple sets of user preferences for a user and allow and/or enable the user to select which set of user preferences are implemented in displaying the shared content. Still other display layout apparatus 104 may include and/or store multiple sets of user preferences for a user, calculate a confidence score for each set of user preferences, and implement the user preference with the greatest calculated score.

Figure 1B:
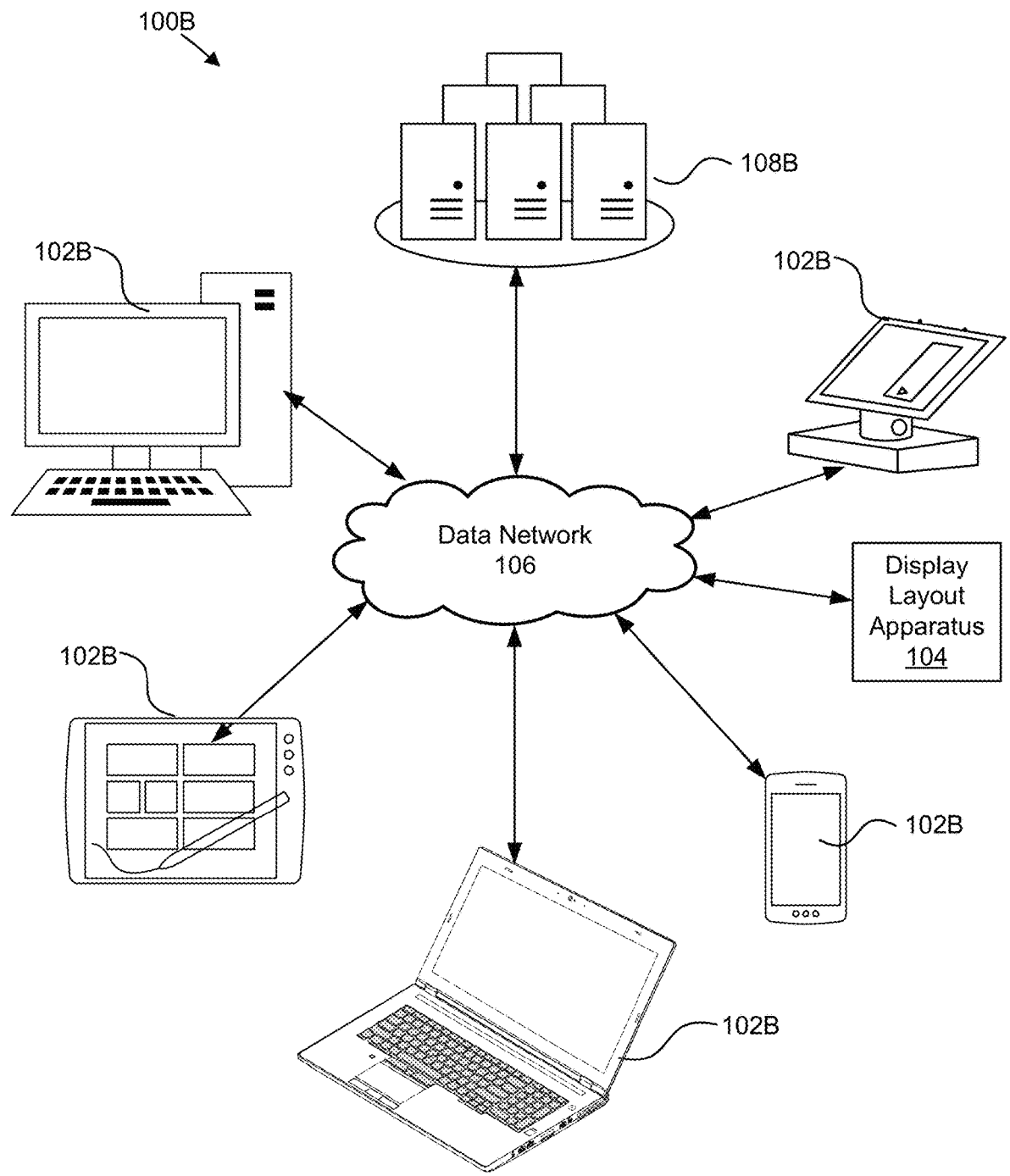

Referring to FIG. 1B, FIG. 1B is a schematic block diagram illustrating another embodiment of a system 100B that can include and/or provide individualized display layouts in multi-person, multi-display collaborative environments. The system 100B is configured to customize the manner in which shared content is displayed on each respective display or screen of each user or participant of a collaborative environment in accordance with a set of preferences for the user associated with a particular display or screen. At least in the illustrated embodiment, the system 100B includes, among other components, a set of computing devices 102B, a set of servers 108B, and a display layout apparatus 104 coupled to and/or in communication with one another via a data network 106 similar to the system 100A discussed elsewhere herein.

A computing device 102B may be similar to any of the embodiments of a computing device 102A discussed above. The computing device(s) 102B can differ from the computing device(s) 102A in that one or more of the computing devices 102A include a display layout apparatus 104 and the computing device(s) 102B may not include a display layout apparatus 104.

A server 108B may be similar to any of the embodiments of a server 108A discussed above. The server(s) 108B can differ from the servers(s) 108A in that one or more of the servers 108A include a display layout apparatus 104 and the server(s) 108B may not include a display layout apparatus 104.

As illustrated in FIG. 1B, a display layout apparatus 104 can be a stand-alone apparatus or device. In various embodiments, a display layout apparatus 104 can include and/or provide different individualized and/or customized display layouts to different users on two or more different computing devices 102B displaying shared content.

Figure 2A:
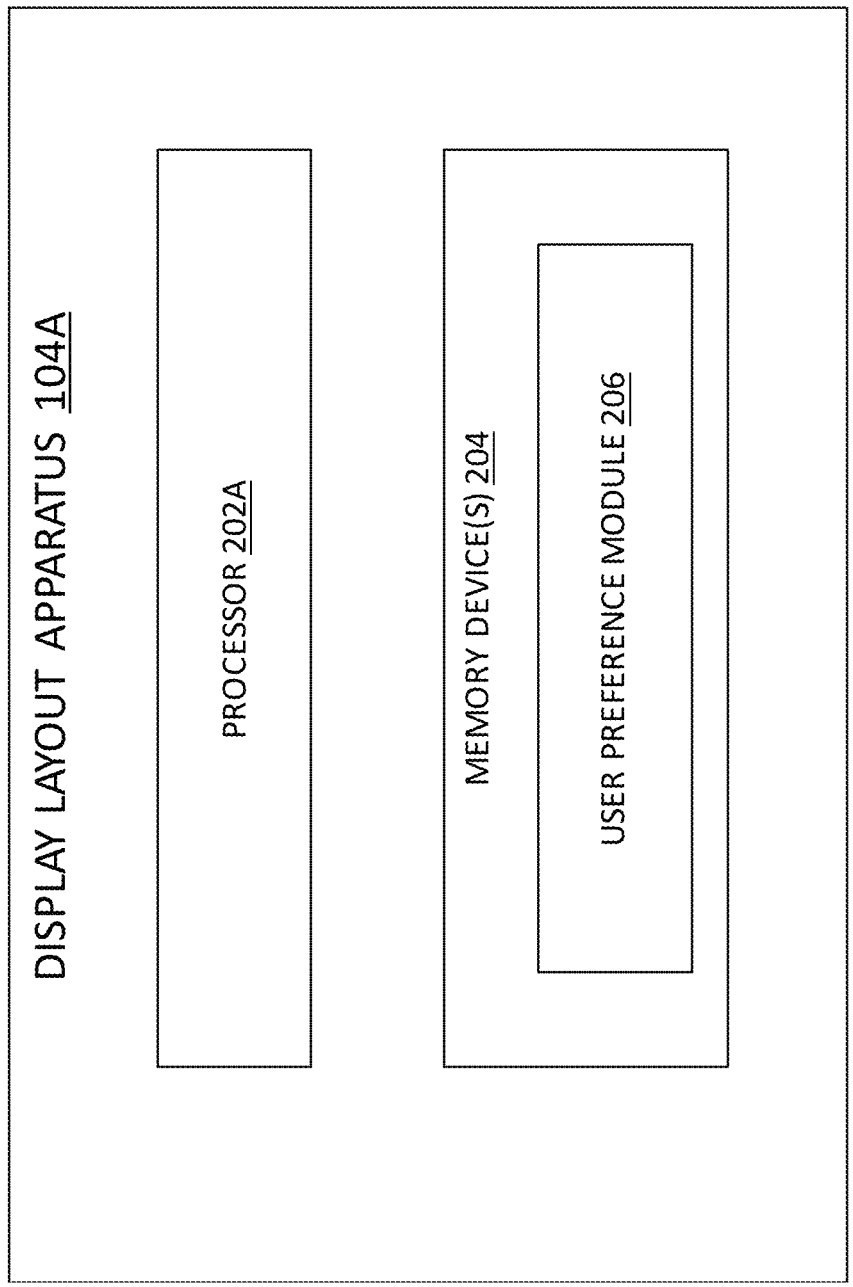
FIGS. 2A and 2B are schematic block diagrams illustrating various embodiments of a display layout apparatus.

With reference to FIG. 2A, FIG. 2A is a schematic block diagram illustrating one embodiment of a display layout apparatus 104A that can include and/or provide individualized display layouts in multi-person, multi-display collaborative environments. At least in the illustrated embodiment, the display layout apparatus 104A includes, among other components, a processor 202A and a set of memory devices 204 coupled to and/or in communication with one another.

A processor 202A may include any suitable non-volatile/persistent hardware and/or software configured to perform and/or facilitate data operations on a display layout apparatus 104A. For instance, a processor 202A may include non-volatile and/or persistent hardware and/or software to execute code stored in one or more memory devices 204 to include and/or provide individualized display layouts in multi-person, multi-display collaborative environments, among other operations that are possible and contemplated herein.

A set of memory devices 204 may include any suitable quantity of memory devices 304. Each memory device 204 may include any type of memory device that is known or developed in the future that is capable of storing data.

A memory device 204, in various embodiments, may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a processor 202A, among other memory operations that are possible and contemplated herein. In various embodiments, the memory device(s) 204 can be implemented as flash memory (e.g., a solid-state devices (SSD) or other non-volatile storage devices that store persistent data). Further, a memory devices 204, in some embodiments, may include non-transitory memory such as, for example, a dynamic random access memory (DRAM) device, a static random access memory (SRAM) device, a hard disk drive (HDD), storage tape (e.g., magnetic and/or virtual), and/or other types (e.g., non-volatile and/or persistent) of memory devices, etc., among other types of non-transitory memory that are possible and contemplated herein. IN additional or alternative embodiments, the memory device(s) 204 may include a semiconductor storage device, a hard disk drive, an optical storage device, a micromechanical storage device, or combinations thereof.

In various embodiments, the set of memory devices 204 is configured to store code that is executable by the processor 202A. In some embodiments, one or more memory device 204 is configured to store a user preference module 206 that is executable by the processor 202A (or a processor 202B (see FIG. 2B)) to include and/or provide individualized display layouts in multi-person, multi-display collaborative environments, as discussed elsewhere herein.

Figure 2B:
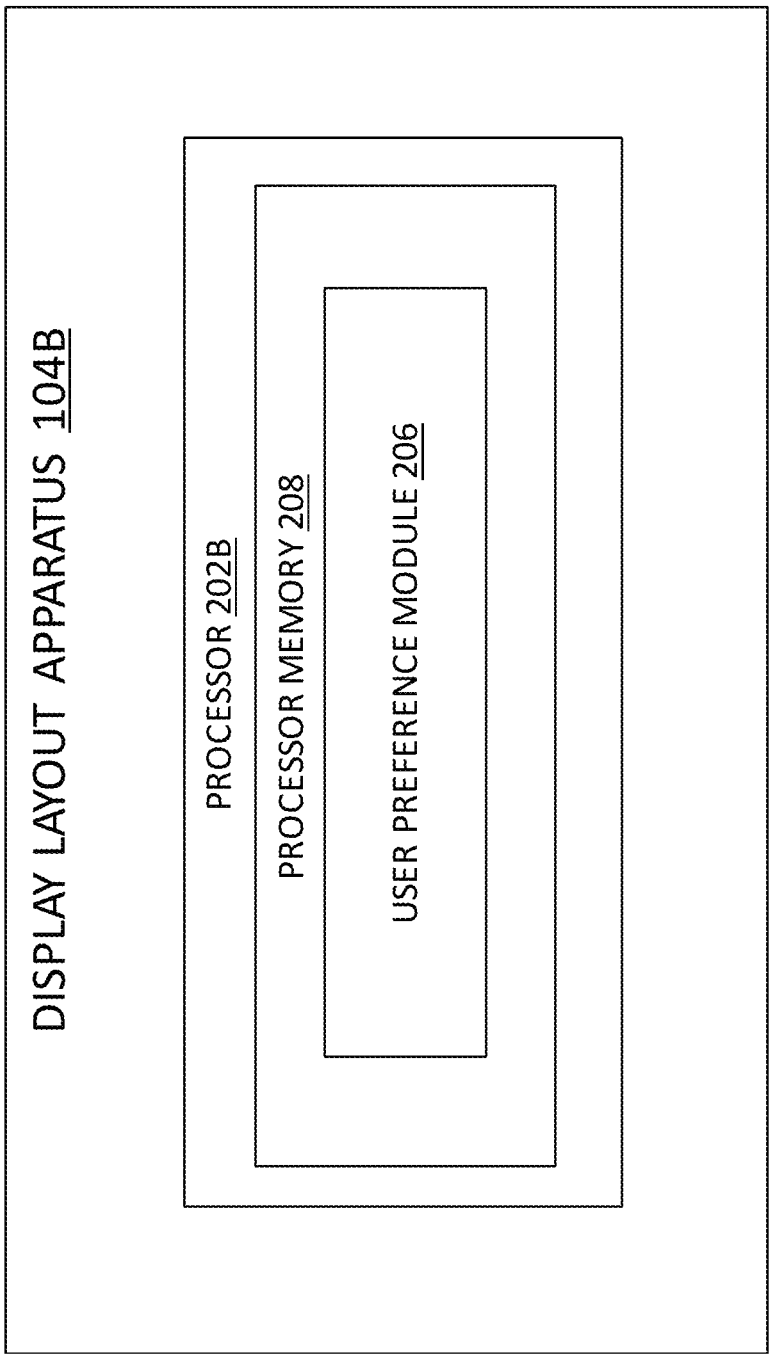

Referring to FIG. 2B, FIG. 2B is a schematic block diagram illustrating another embodiment of a display layout apparatus 104B that can include and/or provide individualized display layouts in multi-person, multi-display collaborative environments. At least in the illustrated embodiment, the display layout apparatus 104B includes, among other components, a processor 202B.

A processor 202B may include any suitable non-volatile/persistent hardware and/or software configured to perform and/or facilitate data operations on a display layout apparatus 104A. In various embodiments, the processor 202B may include non-volatile (e.g., persistent) hardware and/or software to execute code included and/or stored in the processor memory 208.

At least in the illustrated embodiment, the processor 202B includes, among other components, a processor memory 208. In various embodiments, the processor memory 208 includes and/or is configured to store a user preference module 206 that is executable by the processor 202B to include and/or provide individualized display layouts in multi-person, multi-display collaborative environments, as discussed elsewhere herein.

Figure 3A:
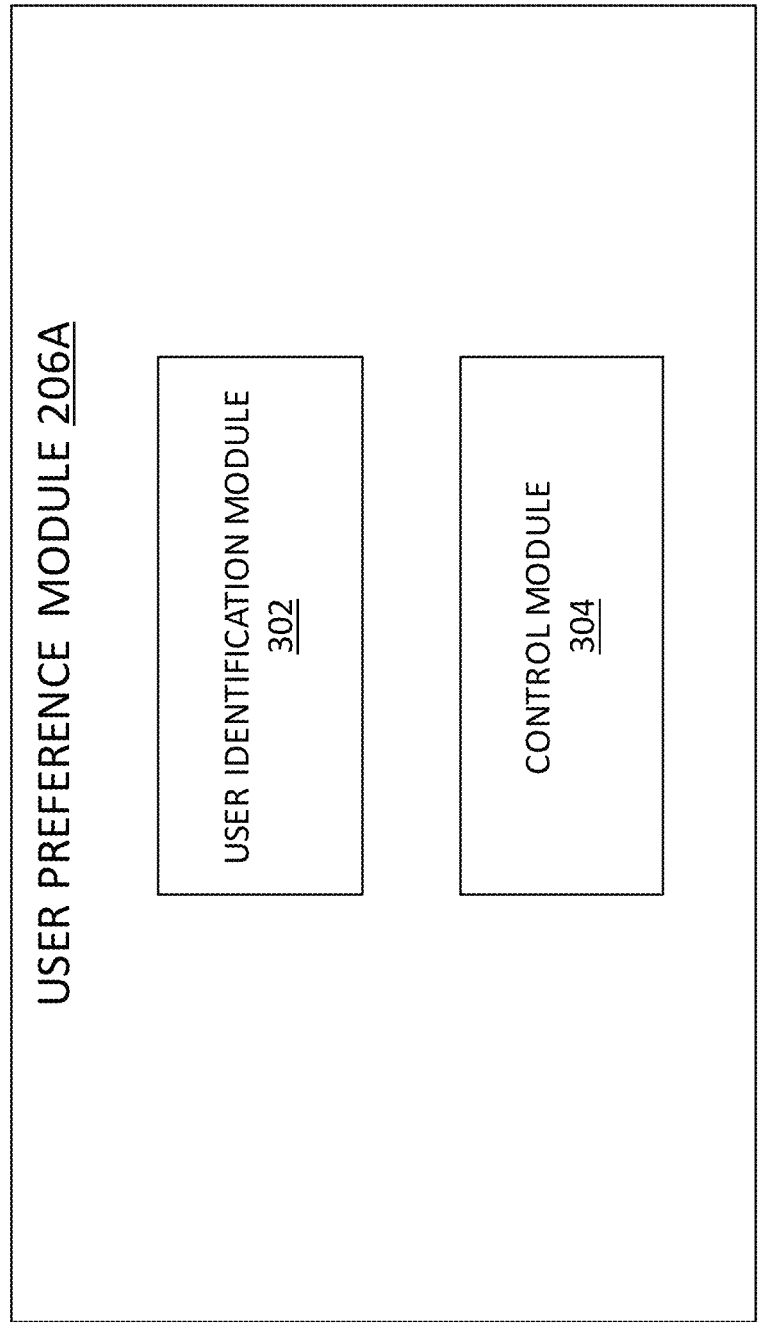
FIGS. 3A and 3B are schematic block diagrams illustrating various embodiments of a user preference module.

With reference to FIG. 3A, FIG. 3A is a schematic block diagram illustrating one embodiment of a user preference module 206A. At least in the illustrated embodiment, the user preference module 206A includes, among other components, a user identification module 302 and a control module 304.

A user identification module 302 may include any suitable hardware and/or software that can detect and identify the different users in a communication session. The user identification module 302 may identify the different users in a communication session using any suitable technique and/or method that can differentiate the various users.

In various embodiments, the user identification module 302 is configured to identify the different users in a communication session based on a unique login for joining a communication session assigned to and/or associated with each different user or participant of the communication session. The unique login may be any type of login including, but not limited to, for example, a username and/or a password, among other types of unique logins that are possible and contemplated herein.

In additional or alternative embodiments, the user identification module 302 is configured to identify the different users in the communication session based on a biometric signature associated with each different user. A biometric signature may include one or more biometric characteristics for a particular user. The biometric characteristic(s) may include any suitable characteristic for a particular user that is/are unique to that user and/or capable of distinguishing the particular user from other users in the communication session.

In various embodiments, the user identification module 302 is configured to capture and/or detect one or more biometric characteristic(s) of an individual attempting to join a communication session and/or access a computing device 102. The user identification module 302 is further configured to compare the captured and/or detected biometric characteristic(s) with the biometric signatures of authorized participants of the communication session to determine if there is a match. The user identification module 302 is configured to allow the individual to join the communication session in response to a match and block the individual from accessing the communication session in response to a non-match.

In some embodiments, the user identification module 302 is configured to identify the different users in the communication session using an identification technique that can detect one or more biometric characteristics defining a biometric signature for each different user. Non-limiting examples of an identification technique configured to detect one or more biometric characteristics defining a biometric signature for a user include, but are not limited to, facial recognition, voice recognition, fingerprint recognition, retina and/or iris recognition, DNA recognition, handwriting recognition, hand geometry recognition, dental recognition, handwriting recognition, behavioral recognition, and/or typing cadence recognition, etc., among other recognition techniques that are capable of differentiating between users that are possible and contemplated herein.

A control module 304 may include any suitable hardware and/or software that can display and/or facilitate display of shared content on a display device in accordance with a set of user preferences for displaying the shared content. In some embodiments, the control module 304 is configured to individualize and/or customize display of the shared content for two or more different users/participants of a communication session in accordance with the set of user preferences for displaying the shared content for each respective user. For example, the control module 304 is configured to display and/or present the shared content of a communication session on display X with the user preferences X associated with user X and display the shared content on display Y with the user preferences Y associated with user Y.

In additional or alternative embodiments, the control module 304 is configured to facilitate individualized and/or customized display of the shared content for two or more different users/participants of a communication session in accordance with the set of user preferences for displaying the shared content for each respective user. For example, the control module 304 is configured to facilitate the display of and/or the presentation of the shared content of a communication session on display V with the user preferences V associated with user V and display the shared content on display W with the user preferences W associated with user W.

Figure 3B:
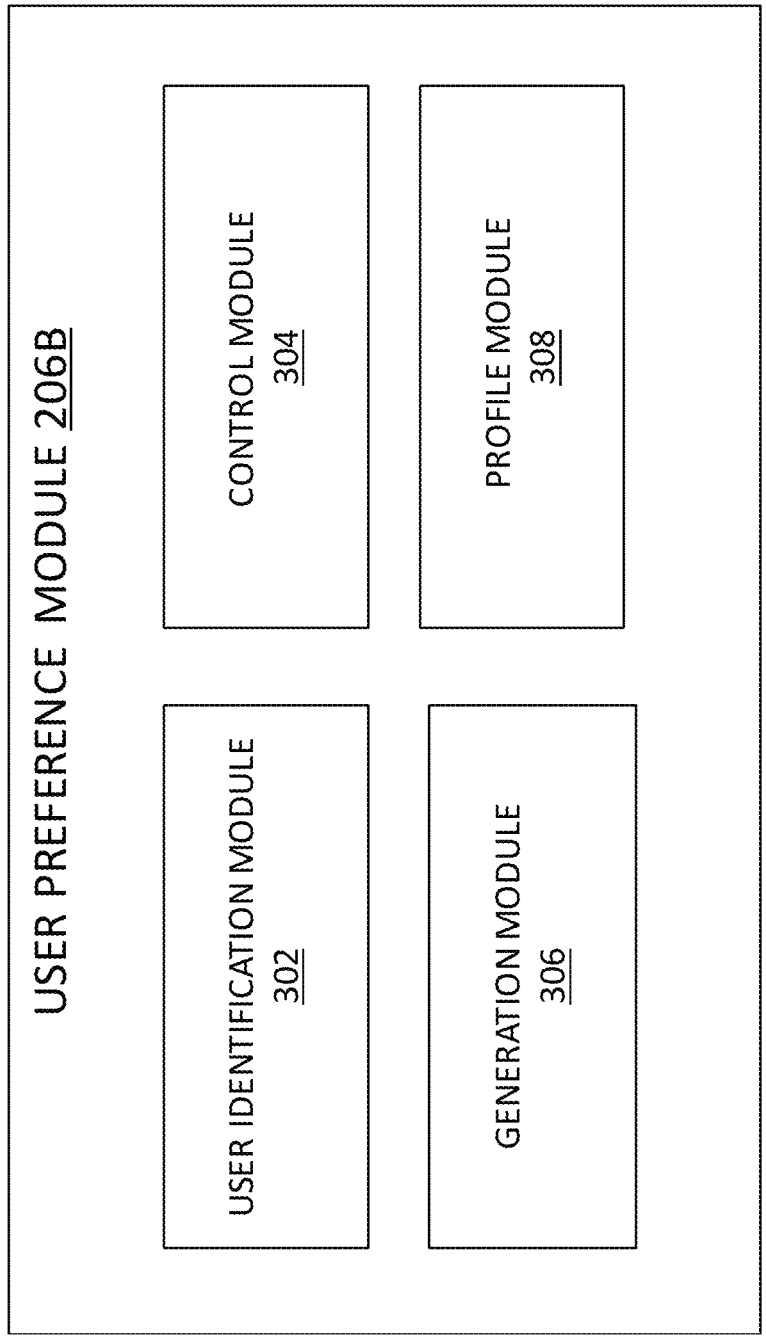

Referring to FIG. 3B, FIG. 3B is a schematic block diagram illustrating another embodiment of a user preference module 206B. In various embodiments, a user preference module 206B includes a user identification module 302 and a control module 304 similar to the various embodiments of a user preference module 206A discussed above with reference to FIG. 3A. At least in the illustrated embodiment, the user preference module 206A includes, among other components, a generation module 306 and a profile module 308.

A generation module 306 may include any suitable hardware and/or software that can generate a set of user preferences that individualize and/or customize display layouts in multi-person, multi-display collaborative environments. In various embodiments, a generation module 306 is configured to generate the set of user preferences for two or more users/participants and/or for each user/participant of a communication session that displays shared content on the display(s) associated with the users/participants.

In certain embodiments, each set of user preferences generated by the generation module 306 for the users of the communication session include the one or more user preferences discussed above. That is, each set of user preferences generated by the generation module 306 includes one or more data layout preferences, one or more data characteristic preferences, and/or one or more context preferences, as discussed elsewhere herein.

In some embodiments, a generation module 306 is configured to generate the set of preferences for a user based on a historical pattern of use for shared content of a communication session and/or one or more portions of the shared content. The historical pattern of use may be based on and/or generated from any suitable amount of data and/or any suitable quantity of patterns of use by a particular user.

In other embodiments, a generation module 306 is configured to generate the set of preferences for a user based on a heat map of use for shared content of a communication session and/or one or more portions of the shared content. The heat map of use may be based on and/or generated from any suitable amount of data and/or any suitable quantity of data use by a particular user.

In various embodiments, a generation module 306 is configured to generate multiple sets of user preferences for one or more users. In some embodiments, the multiple sets of user preferences for the user(s) include a single set of user preferences related to multiple shared contents. For example, the user(s) can include at least one set of user preferences related to shared content A and another set of user preferences related to shared content B.

In other embodiments, the multiple sets of user preferences for the user(s) include multiple sets of user preferences related to the same shared content. In another non-limiting example, the user(s) can include tow or more sets of user preferences related to shared content C.

A generation module 306, in various embodiments, is configured to include and/or utilize a machine learning algorithm that analyzes the historical pattern of use or the heat map of use generate the set(s) of user preferences for a particular user. The machine learning algorithm may include any suitable machine learning algorithm.

In some embodiments, the machine learning algorithm includes a deep learning algorithm. The deep learning algorithm may include any suitable deep learning algorithm.

A generation module 306, in various other embodiments, is configured to include and/or utilize a pattern matching algorithm that analyzes the historical pattern of use or the heat map of use generate the set(s) of user preferences for a particular user. The pattern matching algorithm may include any suitable algorithm that can match patterns of use and/or determine a pattern of use that is utilized most frequently by a user with respect to particular data and/or shared content.

In various embodiments, the generation module 306 is coupled to and/or in communication with a profile module 308. In some embodiments, the generation module 306 is configured to transmit the sets of user preferences generated by the generation module 306 to a profile module 308.

A profile module 308 may include any suitable hardware and/or software that can store and/or is configured to store a user profile for a set of users of a communication session. In various embodiments, the profile module 308 is coupled to and/or in communication with the generation module 306 and is configured to receive the sets of user preferences generated by the generation module 306.

A user profile, in some embodiments, includes among other data, one or more sets of user preferences for two or more users of a communication session. As discussed above, the set(s) of user preferences may include a single set of user preferences related to a particular shared content, a single set of user preferences related to two or more different shared contents, multiple sets of user preferences related to the particular shared content, multiple sets of user preferences related to two or more different shared contents, and/or combinations thereof.

In additional or alternative embodiments, a user profile includes one or more biometric signatures for the users of a communication session. The biometric signature(s) for each user may include any of the unique biometric characteristics associated with a particular user that can be used to identify the user that are discussed above.

The user profile module 308, in some embodiments, is configured to enable and/or allow a user identification module 302 to access the user profiles stored therein. A user identification module 302, in some embodiments, is further configured to access the user profiles stored in the user profile module 308 and utilize the biometric signature(s) in the user profiles stored in the user profile module 308 in identifying the user and granting/blocking access to the communication session based on a match thereof, as discussed elsewhere herein.

In additional or alternative embodiments, the user profile module 308 is configured to enable and/or allow a control module 304 to access the user profiles stored therein. A control module 304, in various embodiments, is further configured to access the user profiles stored in the user profile module 308, select a set of user preferences for two or more users of a communication session, and implement each selected set of user preferences corresponding to the two or more users on one or more displays associated with each respective user.

In some embodiments, the control module 304 is configured to select and implement a set of user preferences for displaying a particular shared content for a particular user in response to the set of user preferences being a single set of user preferences corresponding to the particular shared content for the particular user. Here, the control module 304 is further configured to display the particular shared content in accordance with the selected and implemented set of user preferences on one or more displays associated with the particular user.

In additional or alternative embodiments, the control module 304 is configured to determine that the user profile module 308 is storing multiple sets of user preferences corresponding to a particular shared content for a particular user and, in response to the determination, transmit the sets of user preferences to the particular user. The control module 304 is further configured to receive a selection from the particular user, implement the set of user preferences selected by the particular user, and display the particular shared content in accordance with the selected and implemented set of user preferences on one or more displays associated with the particular user.

In further additional or alternative embodiments, the control module 304 is configured to determine that the user profile module 308 is storing multiple sets of user preferences for a particular user and, in response to the determination, calculate a confidence score for each set of user preferences as the sets of user preferences relate to a particular shared content and in which the confidence score is an indicator of correlation between a set of user preferences and shared content. The control module 304 is further select the set of user preferences with the greatest or highest calculated confidence score, implement the selected set of user preferences, and display the particular shared content in accordance with the selected and implemented set of user preferences on one or more displays associated with the particular user.

Figure 4A:
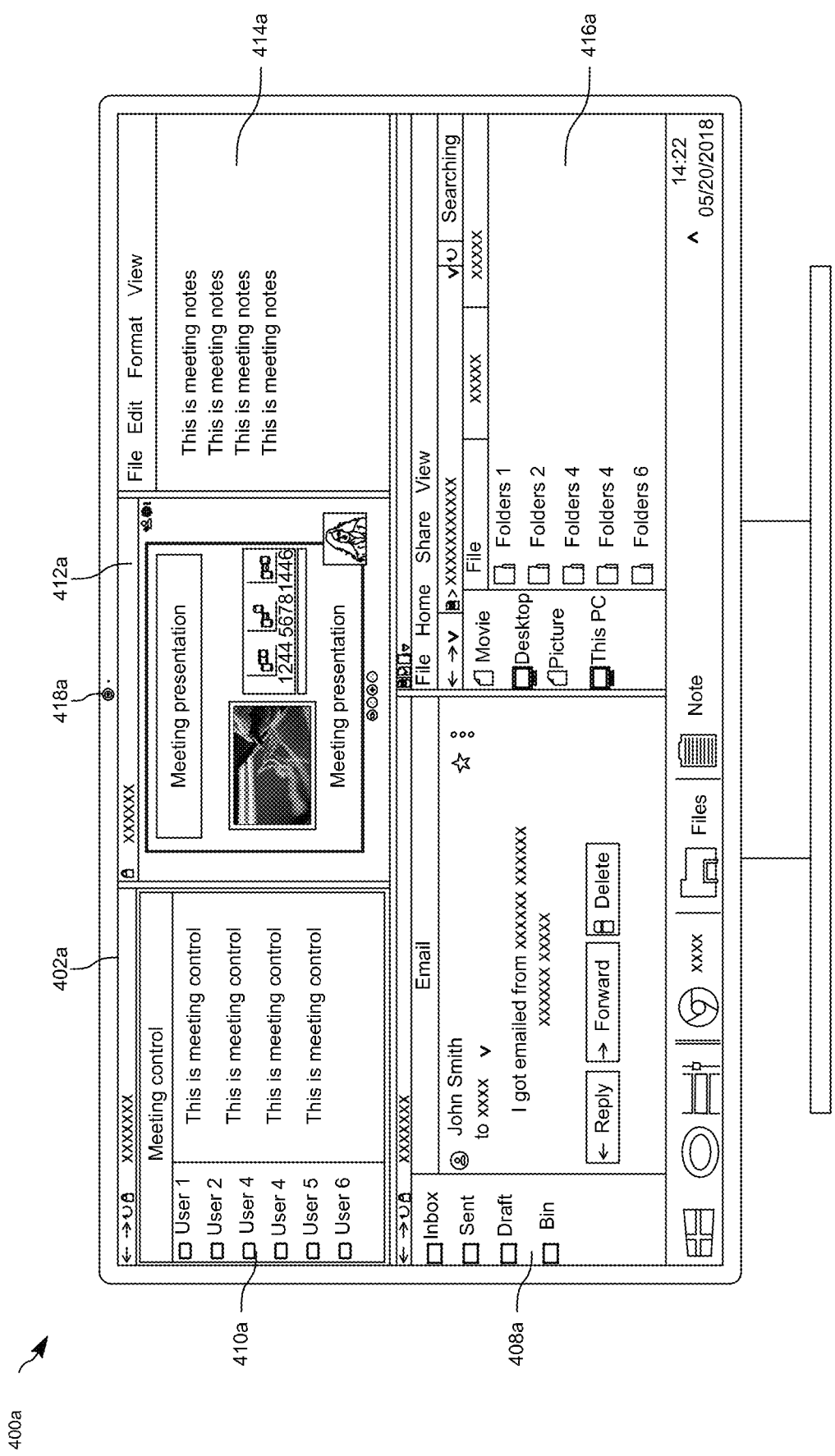
FIGS. 4A and 4B are schematic diagrams illustrating various examples of user preferences for displaying shared content on different display devices and/or screens.
Figure 4B:
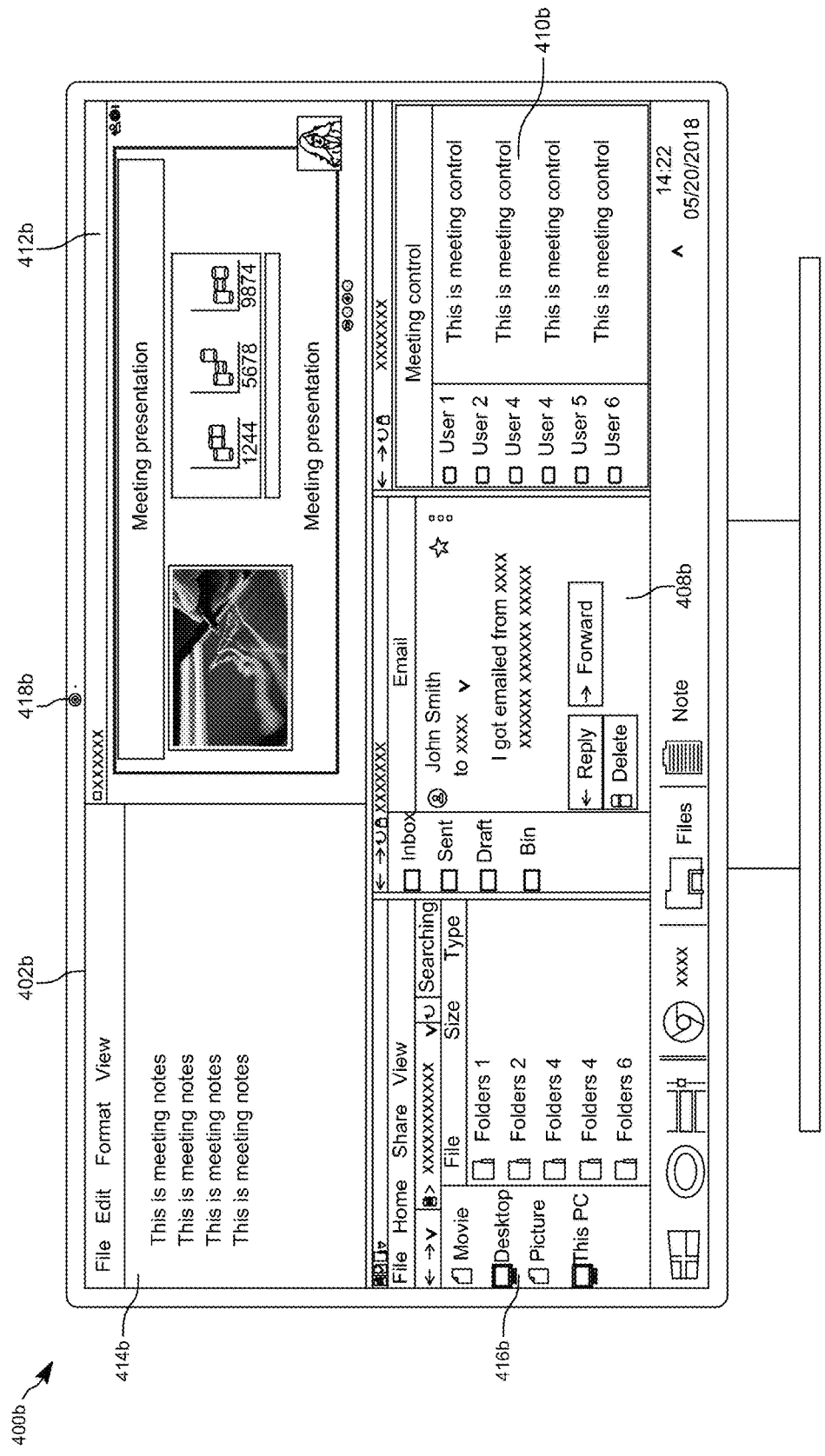

With reference to FIG. 4A, FIG. 4A is a schematic diagram illustrating shared content being displayed on a display device in accordance with one example of a user preference 400a. Similarly, FIG. 4B is a schematic diagram illustrating the same shared content being simultaneously displayed on a different display device in accordance with another example of a user preference 400b. That is, user preferences 400a and 400b are each customized and/or individualized display of shared content for two participants of a communication session. Specifically, FIG. 4A illustrates the shared content being displayed in a customized and/or individualized layout for a participant of a communication session and FIG. 4B illustrates the same shared content being displayed in another customized and/or individualized layout for a different participant of the communication session.

In comparing user preferences 400a and 400b, it is evident that the devices/screens 402a and 402b are displaying the same shared content with different layouts in accordance with different user preferences. An email window 408a is located in the lower left corner of the device/screen 402a and an email window 408b is located on the bottom center of the device/screen 402b and the email windows 408a and 408b are displayed with different sizes. The meeting control windows 410a and 410b are presented at different locations on the devices/screens 402a and 402b (e.g., upper left corner and lower right corner, respectively). A meeting presentation window 412a is located in the upper center of the device/screen 402a and meeting presentation window 412b is located on the upper center and left of the device/screen 402b and the meeting presentation windows 412a and 412b are displayed with different sizes. The meeting notes 414a are displayed on the upper right corner of the device/screen 402a and the meeting notes are displayed on the upper left corner of the device/screen 402b. Further, the data window 416a is shown in the center and lower right corner, while the data window 416b is shown in the lower left corner with different dimensions than the data window 416a. The cameras 418a and 418b are positioned at the same location in FIGS. 4A and 4B.

While FIGS. 4A and 4B illustrate different examples of the same shared content being displayed differently and/or with different formats, the various embodiments discussed herein are not limited to such examples. That is, various other embodiments may include different user preferences and/or alternative differences between user preferences. As such, infinite quantities of user preferences and/or infinite quantities of alternative differences between user preferences are possible.

Figure 5A:
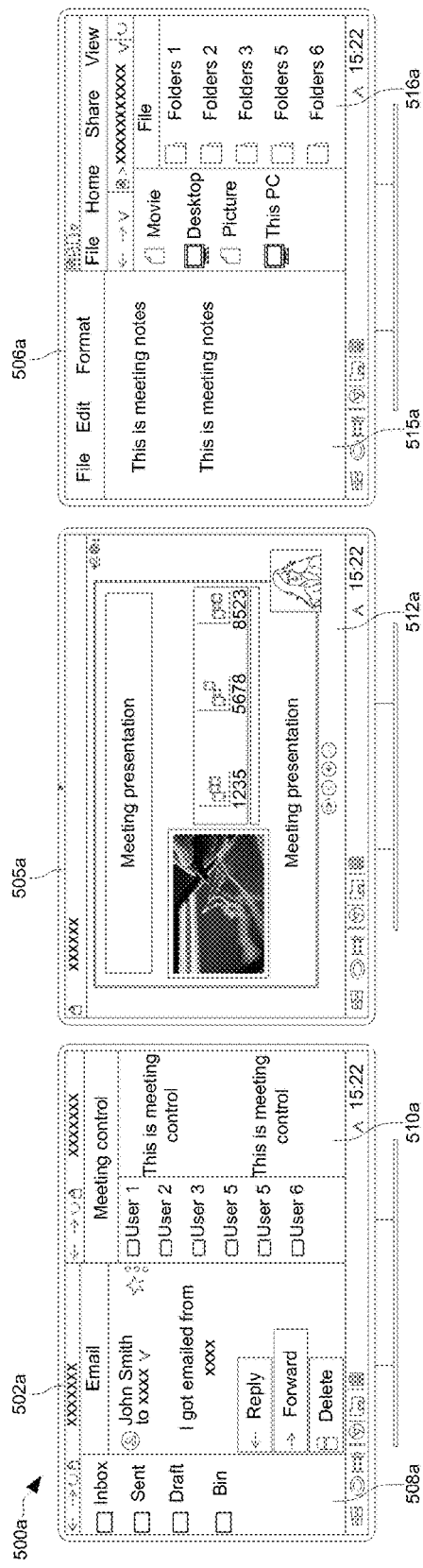
FIGS. 5A and 5B are schematic diagrams illustrating various examples of user preferences for displaying shared content on multiple different display devices and/or screens.
Figure 5B:
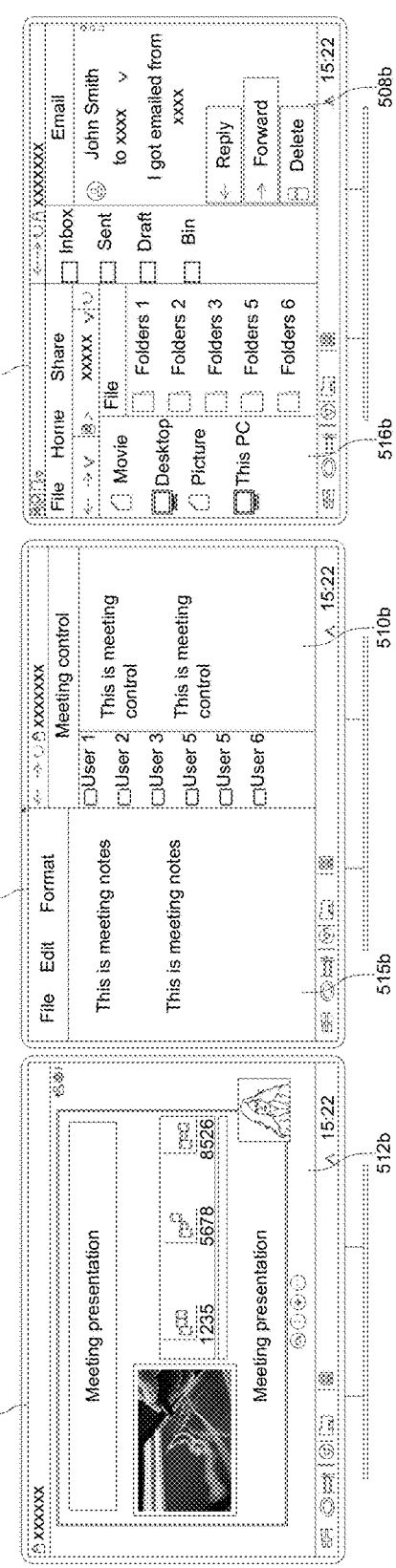

Referring to FIG. 5A, FIG. 5A is a schematic diagram illustrating shared content being displayed on a set of display devices/screens in accordance with one example of a user preference 500a. Similarly, FIG. 5B is a schematic diagram illustrating the same shared content being simultaneously displayed on a different set of display devices/screens in accordance with another example of a user preference 500b. That is, user preferences 500a and 500b are each customized and/or individualized display of shared content for two participants of a communication session. Specifically, FIG. 5A illustrates the shared content being displayed in a customized and/or individualized layout for a participant of a communication session and FIG. 5B illustrates the same shared content being displayed in another customized and/or individualized layout for a different participant of the communication session.

In comparing user preferences 500a and 500b, it is evident that different portions of the same shared content are illustrated on different display devices and/or screens in accordance with different user preferences. An email window 508a and a meeting control window are displayed on a display device/screen 502a, while a display device/screen 502b displays a meeting presentation window 512b. A display device/screen 505a displays a meeting presentation window 512a, while a display device/screen 505b displays a meeting notes window 515b and a meeting control window 510b. Further, a display device/screen 506a displays a meeting notes window 515a and a data window 516a, whereas a display device/screen 506b displays a data window 516b and an email window 508b.

While FIGS. 5A and 5B illustrate different examples of the same shared content being displayed differently and/or with different formats on multiple display devices/screen, the various embodiments discussed herein are not limited to such examples. That is, various other embodiments may include different user preferences and/or alternative differences between user preferences. As such, infinite quantities of user preferences and/or infinite quantities of alternative differences between user preferences are possible.

Figure 6A:
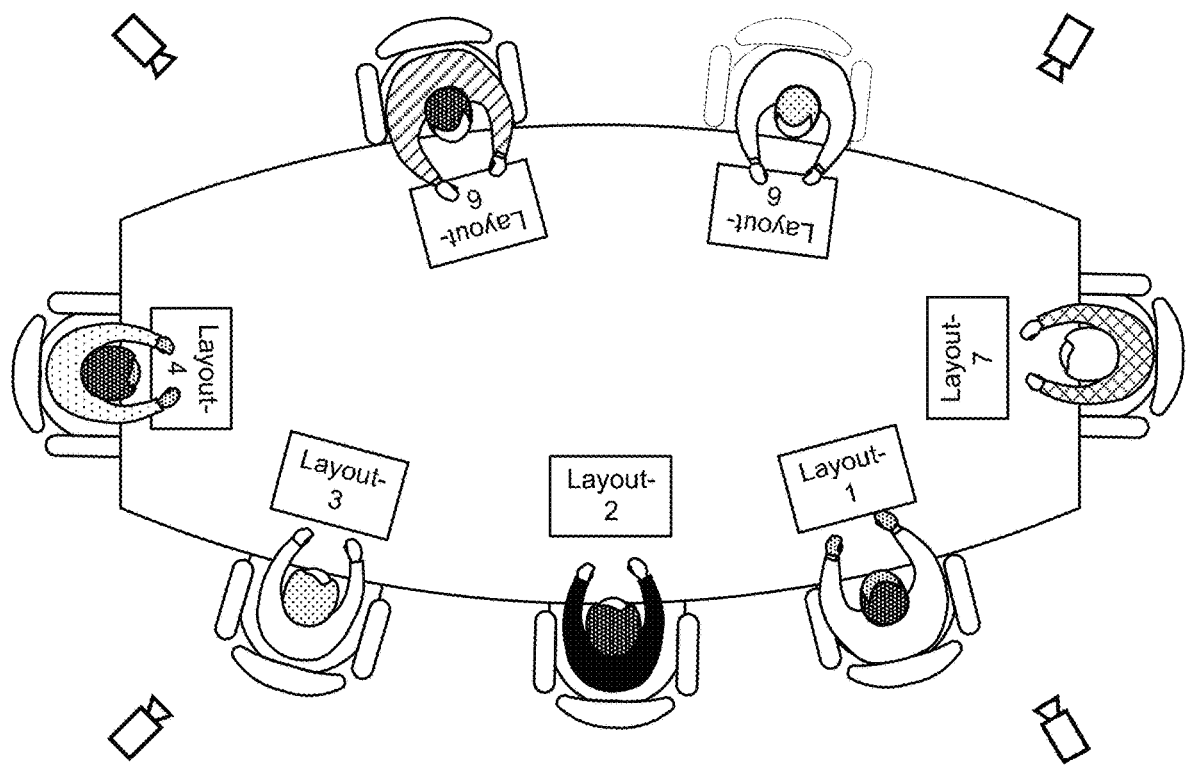
FIG. 6A is a schematic diagram illustrating one example of user preferences for displaying shared content on multiple different display devices associated with different users.

With reference to FIG. 6A, FIG. 6A is a schematic diagram illustrating shared content being displayed in a customized manner on at least two different display devices in accordance with at least two different user preferences. In FIG. 6A, the same content is displayed on seven (7) display devices.

The shared content is displayed in accordance with six (6) different user preferences. Specifically, two users prefer and/or are associated with the same layout (e.g., layout 6) and the five other users prefer and/or are associated with different and/or unique layouts (e.g., layouts 1, 2, 3, 4, and 7).

Here, when each user attempts to join the communication session, each user is identified. Once identified, a set of user preferences corresponding to the layout of the shared content for each user is selected, implemented, and displayed on the display device associated with each respective user.

Figure 6B:
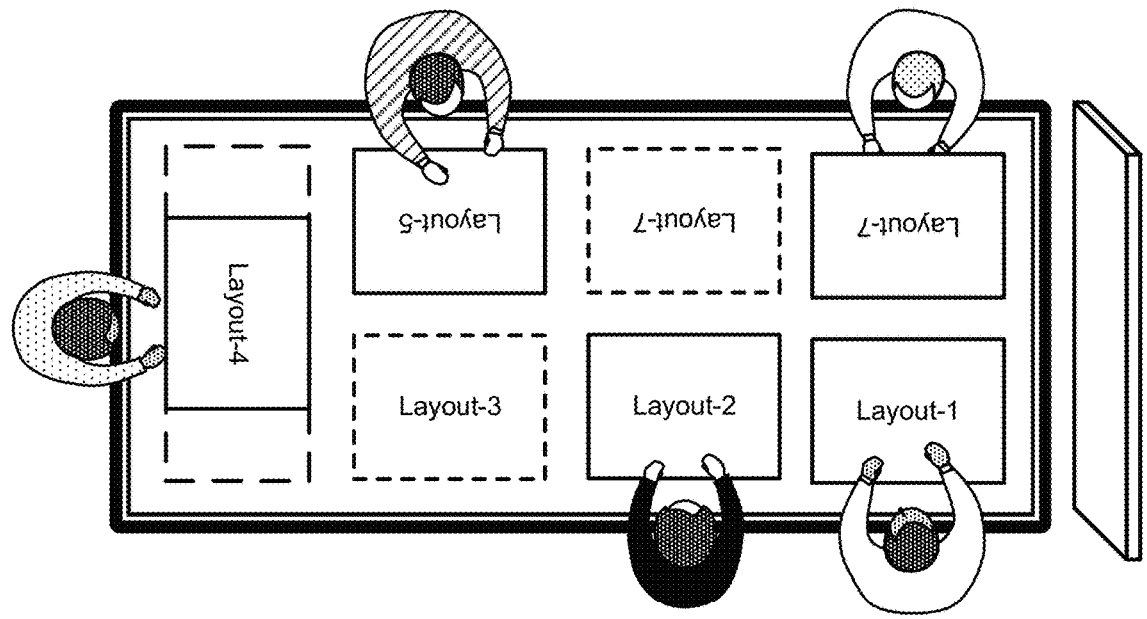
FIG. 6B is a schematic diagram illustrating one example of user preferences for displaying shared content on multiple different screens associated with different users of the same display device.

Referring to FIG. 6B, FIG. 6B is a schematic diagram illustrating shared content being displayed in a customized manner on at least two different screens of the same display device in accordance with at least two different user preferences. In FIG. 6B, the same content is displayed on five (5) of seven screens of the display device.

The shared content is displayed in accordance with five different user preferences. Specifically, the five users prefer and/or are associated with five different and/or unique layouts (e.g., layouts 1, 2, 4, 5, and 7).

Here, when each user attempts to join the communication session, each user is identified. Once identified, a set of user preferences corresponding to the layout of the shared content for each user is selected, implemented, and displayed on the screen associated with each respective user.

Figure 7:
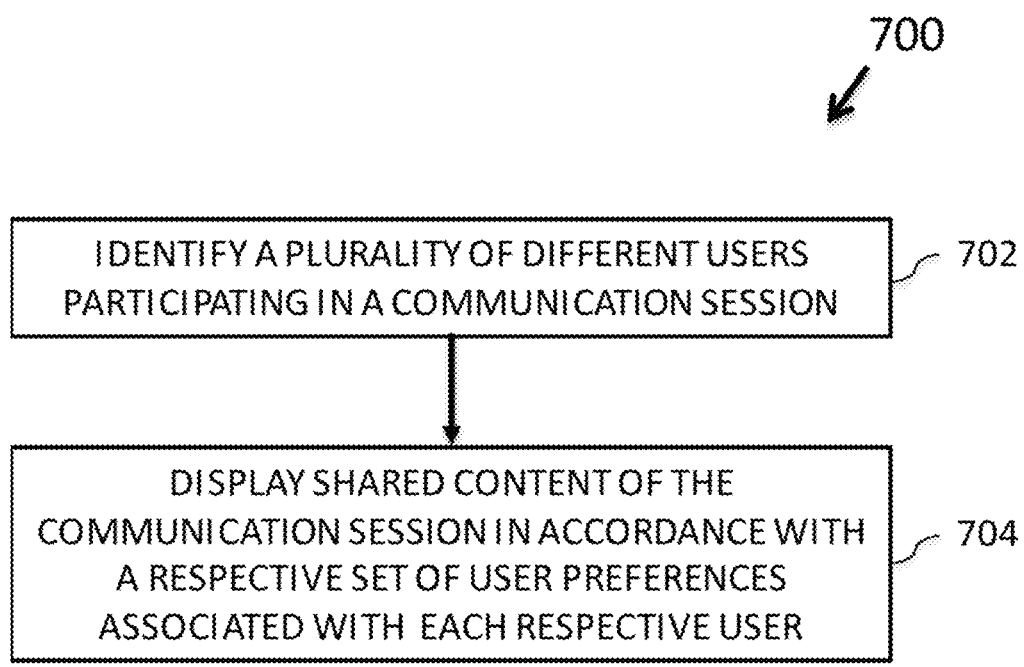
FIG. 7 is a schematic flow chart diagram illustrating one embodiment of a method for including and/or providing individualized display layouts in multi-person, multi-display collaborative environments.

With reference to FIG. 7, FIG. 7 is a schematic flow chart diagram illustrating one embodiment of a method 700 for including and/or providing individualized display layouts in multi-person, multi-display collaborative environments. At least in the illustrated embodiment, the method 700 begins by identifying a plurality of different users participating in a communication session for a plurality of communication devices (block 702). In some embodiments, each communication device in the plurality of communication devices includes a display device and is associated with a different user in the plurality of different users.

The method 700 further includes displaying shared content of the communication session on each respective display device in accordance with a respective set of user preferences for displaying the shared content for each different user in the plurality of different users (block 704). In various embodiments, the method 700 may be implemented substantially, as described above, with respect to the functions and/or operations of the apparatus 104, 104A, and 104B and processors 202A and 202B, as described with reference to FIGS. 1A-6B.

Figure 8:
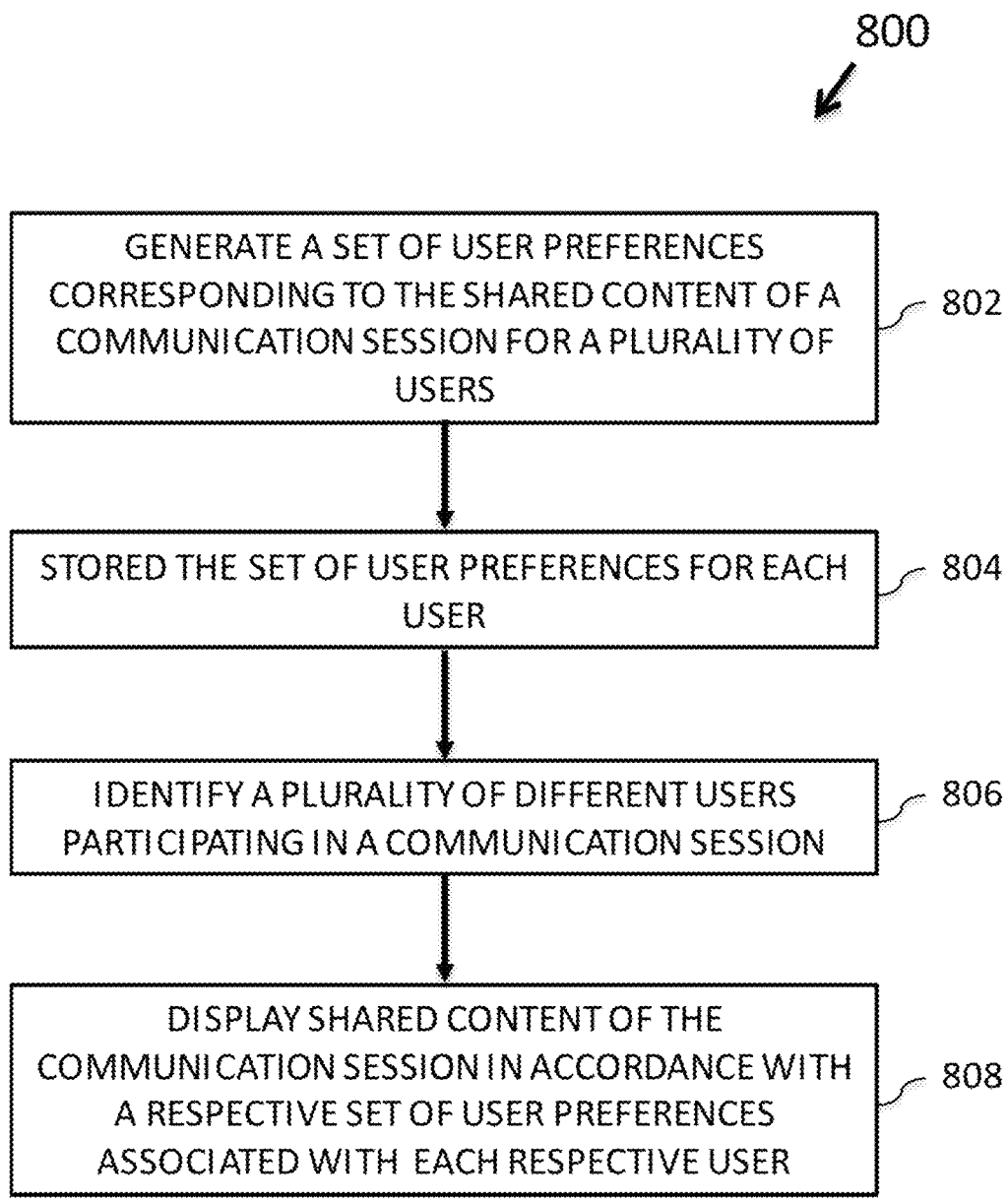
FIG. 8 is a schematic flow chart diagram illustrating another embodiment of a method for including and/or providing individualized display layouts in multi-person, multi-display collaborative environments.

FIG. 8 is a schematic flow chart diagram illustrating another embodiment of a method 800 for including and/or providing individualized display layouts in multi-person, multi-display collaborative environments. At least in the illustrated embodiment, the method 800 begins by generating a set of user preferences corresponding to the shared content of a communication session for a plurality of users (block 802). The set of user preferences for each user can be generated using a machine learning algorithm (e.g., a deep learning algorithm) or a pattern matching algorithm. The machine learning algorithm or the pattern matching algorithm can calculate or determine the sets of user preferences based on a pattern of use or a heat map of use for each user with respect to the shared content and/or portions of the shared content.

The method 800 further includes storing the set of user preferences for each of the users (block 804). In some embodiments, the set of user preferences for each of the users is stored in a respective user profile for users.

In some embodiments, the method 800 further includes identifying a plurality of different users participating in a communication session for a plurality of communication devices (block 806). In some embodiments, each communication device in the plurality of communication devices includes a display device and is associated with a different user in the plurality of different users.

The method 800 further includes displaying shared content of a communication session on each respective display device in accordance with a respective set of user preferences for displaying the shared content for each different user in the plurality of different users (block 808). In various embodiments, the method 800 may be implemented substantially, as described above, with respect to the functions and/or operations of the apparatus 104, 104A, and 104B and processors 202A and 202B, as described with reference to FIGS. 1A-6B.

Figure 9:
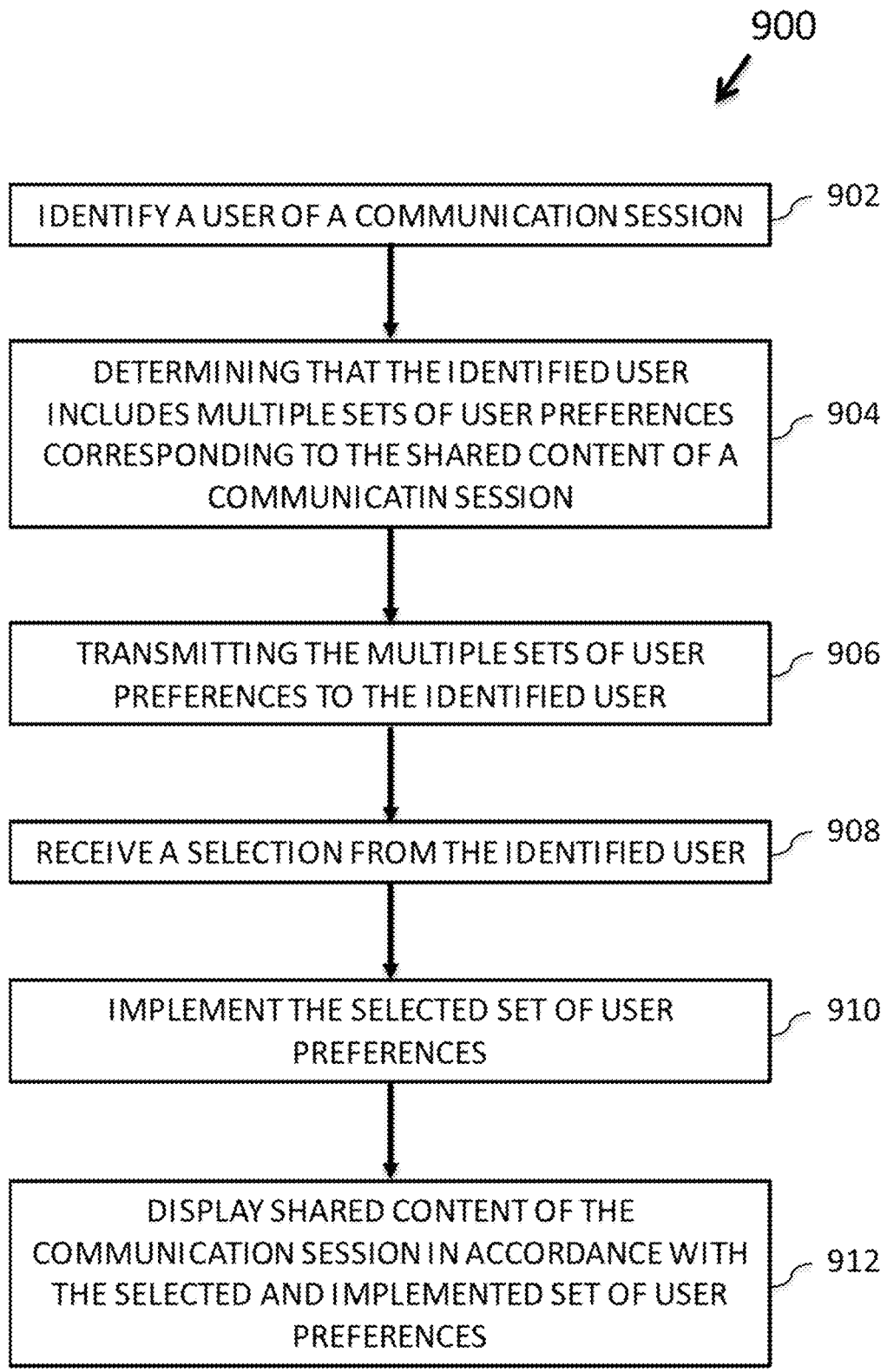
FIG. 9 is a schematic flow chart diagram illustrating yet another embodiment of a method for including and/or providing individualized display layouts in multi-person, multi-display collaborative environments.

FIG. 9 is a schematic flow chart diagram illustrating yet another embodiment of a method 900 for including and/or providing individualized display layouts in multi-person, multi-display collaborative environments. At least in the illustrated embodiment, the method 900 begins by identifying a user participating in a communication session (block 902).

The method 900 continues by determining that the user includes multiple sets of user preferences corresponding to the shared content of the communication session (block 904). In response to the determination, the method 900 includes transmitting the multiple sets of user preferences corresponding to the shared content to the user (block 906), receiving a selection from the user (block 908), and implanting the selected set of user preferences corresponding to the shared content (block 910).

The method 900 further includes displaying the shared content in accordance with the selected and implemented set of user preferences (block 912). In various embodiments, the method 900 may be implemented substantially, as described above, with respect to the functions and/or operations of the apparatus 104, 104A, and 104B and processors 202A and 202B, as described with reference to FIGS. 1A-6B.

Figure 10:
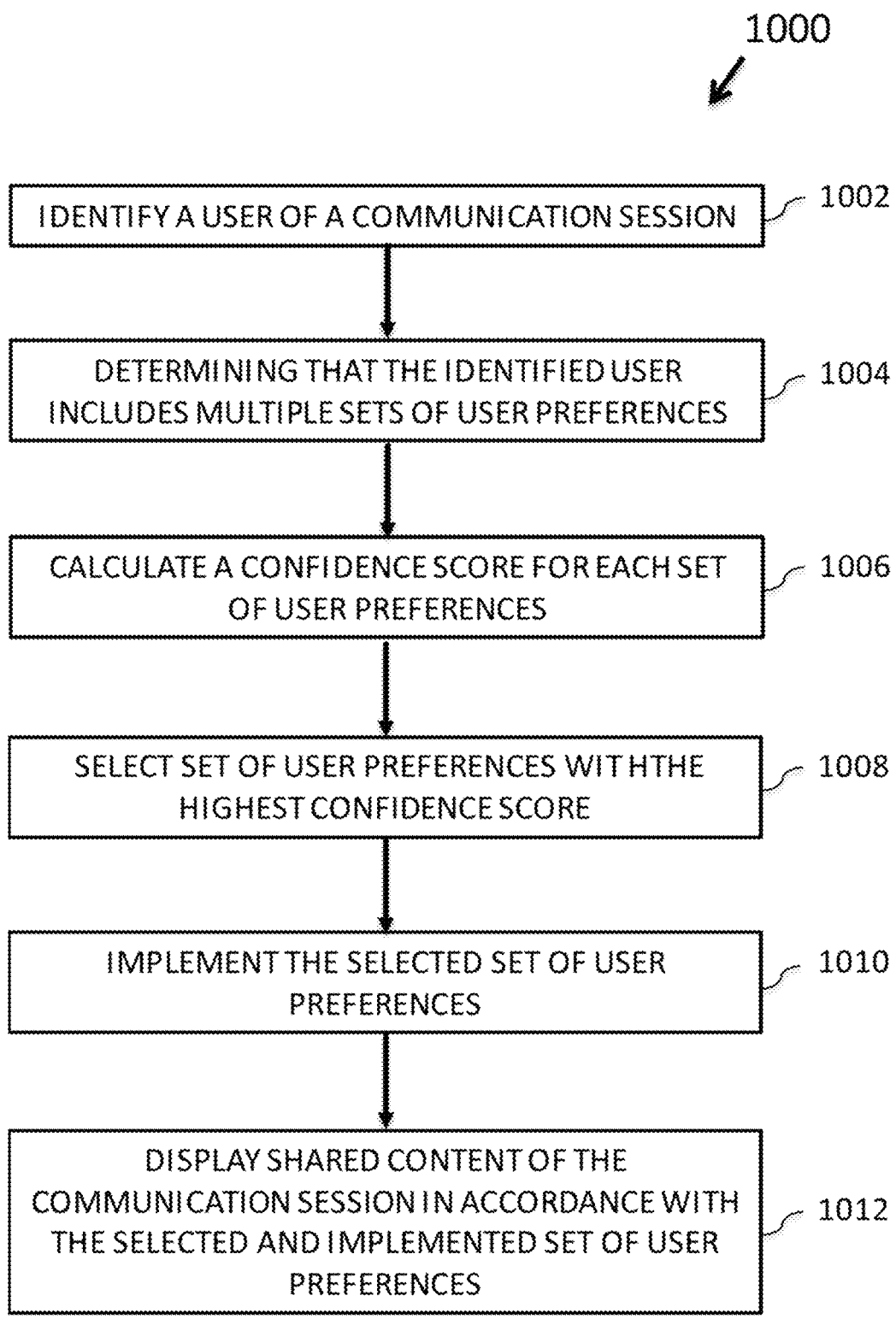
FIG. 10 is a schematic flow chart diagram illustrating still another embodiment of a method for including and/or providing individualized display layouts in multi-person, multi-display collaborative environments.

FIG. 10 is a schematic flow chart diagram illustrating still another embodiment of a method 1000 for including and/or providing individualized display layouts in multi-person, multi-display collaborative environments. At least in the illustrated embodiment, the method 1000 begins by identifying a user participating in a communication session (block 1002).

The method 1000 continues by determining that the user includes multiple sets of user preferences for various shared content (block 1004). In response to the determination, the method 1000 includes calculating a confidence score for each of the multiple sets of user preferences (block 1006), selecting the set of user preferences with the highest calculated confidence score (block 1008), and implanting the selected set of user preferences corresponding to the highest calculated score (block 1010).

The method 1000 further includes displaying the shared content in accordance with the selected and implemented set of user preferences (block 1012). In various embodiments, the method 1000 may be implemented substantially, as described above, with respect to the functions and/or operations of the apparatus 104, 104A, and 104B and processors 202A and 202B, as described with reference to FIGS. 1A-6B.

In some embodiments, a program product performs one or more portions of the methods 700, 800, 900, and/or 1000. For example, in one embodiment, a computer program product includes code for including and/or providing individualized display layouts in multi-person, multi-display collaborative environments.

Accordingly, the systems 100A and 100B, the apparatus 104, 104A, and 104B, the processors 202A and 202B, and the methods 700, 800, 900, and 1000 may operate according to the various embodiments disclosed herein to including and/or providing individualized display layouts in multi-person, multi-display collaborative environments. These embodiments provide more convenient ways to include and/or provide individualized display layouts in multi-person, multi-display collaborative environments.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
   a processor of an information handling device; and
   a memory that stores code executable by the processor to:
      identify a plurality of different users participating in a communication session for a plurality of communication devices, wherein each communication device in the plurality of communication devices includes a display device and is associated with a different user in the plurality of different users,
      display a shared content on each respective display device in accordance with a respective set of user preferences for displaying the shared content for each different user in the plurality of different users, and
      generate the set of user preferences for displaying the shared content for each different user based on one of:
         a historical pattern of use for one or more portions of the shared content, and
         a heat map of use for one or more portions of the shared content,
      wherein the set of user preferences for displaying the shared content for each different user is generated utilizing a machine learning algorithm based on the one of the historical pattern of usage and the heat map of usage.

2. The apparatus of claim 1, wherein:
   the code is further executable by the processor to:
      determine the respective set of user preferences for displaying the shared content corresponding to each identified different user; and
   each set of user preferences for displaying the shared content comprises one or more one of:
      a data layout preference,
      a data characteristic preference, and
      a context preference.

3. The apparatus of claim 1, wherein identifying each different user participating in the communication session is based on one of:
   a unique login for each different user;
   a biometric signature for each different user; and
   the unique login and the biometric signature.

4. The apparatus of claim 1, wherein:
   the machine learning algorithm comprises a deep learning algorithm.

5. The apparatus of claim 1, wherein the code is further executable by the processor to:
   generate a plurality of different sets of user preferences for a particular user; and
   implement the respective set of user preferences for displaying the shared content for the particular user in response to the respective set of user preferences for displaying the shared content being a single set of user preferences corresponding to the shared content for the particular user.

6. The apparatus of claim 1, wherein the code is further executable by the processor to:
   generate a plurality of different sets of user preferences corresponding to the shared content for a particular user;
   present the plurality of different sets of user preferences for displaying the shared content for a particular user to the particular user; and
   implement the respective set of user preferences for displaying the shared content for the particular user in response to receiving an input from the particular user selecting the respective set of user preferences for displaying the shared content for the particular user.

7. The apparatus of claim 1, wherein the code is further executable by the processor to:
   generate a plurality of different sets of user preferences for a particular user;
   calculate a confidence score for each different set of user preferences; and
   implement the respective set of user preferences for displaying the shared content for the particular user in response to the respective set of user preferences for displaying the shared content for the particular user including a greatest calculated confidence score.

8. A method, comprising:
   identifying, by use of a processor, a plurality of different users participating in a communication session for a plurality of communication devices, wherein each communication device in the plurality of communication devices includes a display device and is associated with a different user in the plurality of different users;
   displaying a shared content on each respective display device in accordance with a respective set of user preferences for displaying the shared content for each different user in the plurality of different users;
   generating, via a machine learning algorithm or a pattern matching algorithm, the set of user preferences for each different user based on one of:
      a historical pattern of use for one or more portions of the shared content, and
      a heat map of use for one or more portions of the shared content and
   determining the respective set of user preferences for displaying the shared content corresponding to each identified different user,
   wherein:
      identifying each different user participating in the communication session is based on one of:

a unique login for each different user,
a biometric signature for each different user, and
the unique login and the biometric signature, and
each set of user preferences for displaying the shared content comprises one or more one of:
a data layout preference,
a data characteristic preference, and
a context preference.

9. The method of claim 8, further comprising:
generating a plurality of different sets of user preferences for a particular user; and
implementing the respective set of user preferences for displaying the shared content for the particular user in response to the respective set of user preferences for displaying the shared content being a single set of user preferences corresponding to the shared content for the particular user.

10. The method of claim 8, further comprising:
generating a plurality of different sets of user preferences corresponding to the shared content for a particular user;
presenting the plurality of different sets of user preferences for displaying the shared content to the particular user; and
implementing the respective set of user preferences for displaying the shared content for the particular user in response to receiving an input from the particular user selecting the respective set of user preferences for displaying the shared content.

11. The method of claim 8, further comprising:
generating a plurality of different sets of user preferences for a particular user;
calculating a confidence score for each different set of user preferences; and
implementing the respective set of user preferences for displaying the shared content for the particular user in response to the respective set of user preferences for displaying the shared content for the particular user including a greatest calculated confidence score.

12. The method of claim 8, wherein:
the set of user preferences for displaying the shared content for each different user is generated utilizing the machine learning algorithm; and
the machine learning algorithm comprises a deep learning algorithm.

13. A computer program product including a computer-readable storage medium that stores code executable by a processor, the executable code comprising code to perform:
identifying a plurality of different users participating in a communication session for a plurality of communication devices, wherein each communication device in the plurality of communication devices includes a display device and is associated with a different user in the plurality of different users;
displaying a shared content on each respective display device in accordance with a respective set of user preferences for displaying the shared content for each different user in the plurality of different users generating, via one of a machine learning algorithm and a pattern matching algorithm, the set of user preferences for each different user based on one of:
a historical pattern of use for one or more portions of the shared content, and
a heat map of use for one or more portions of the shared content and
determining the respective set of user preferences for displaying the shared content corresponding to each identified different user,
wherein:
identifying each different user participating in the communication session is based on one of:
a unique login for each different user,
a biometric signature for each different user, and
the unique login and the biometric signature, and
each set of user preferences for displaying the shared content comprises one or more one of:
a data layout preference,
a data characteristic preference, and
a context preference.

14. The computer program product of claim 13, wherein the executable code further comprises code to perform:
generating a plurality of different sets of user preferences for a particular user; and
implementing the respective set of user preferences for displaying the shared content for the particular user in response to the respective set of user preferences for displaying the shared content being a single set of user preferences corresponding to the shared content for the particular user.

15. The computer program product of claim 13, wherein the executable code further comprises code to perform:
generating a plurality of different sets of user preferences corresponding to the shared content for a particular user;
presenting the plurality of different sets of user preferences for displaying the shared content for the particular user to the particular user; and
implementing the respective set of user preferences for displaying the shared content for the particular user in response to receiving an input from the particular user selecting the respective set of user preferences for displaying the shared content for the particular user.

16. The computer program product of claim 13, wherein the executable code further comprises code to perform:
generating a plurality of different sets of user preferences for a particular user;
calculating a confidence score for each different set of user preferences; and
implementing the respective set of user preferences for displaying the shared content for the particular user in response to the respective set of user preferences for displaying the shared content for the particular user including a greatest calculated confidence score.

17. The computer program product of claim 13, wherein:
the set of user preferences for displaying the shared content for each different user is generated utilizing the machine learning algorithm; and
the machine learning algorithm comprises a deep learning algorithm.

* * * * *